(No Model.)
C. A. FELLOWS.
FURNITURE CASTER.
No. 492,624. Patented Feb. 28, 1893.
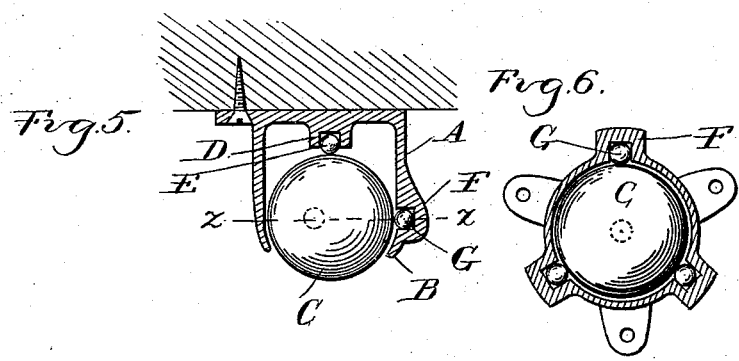
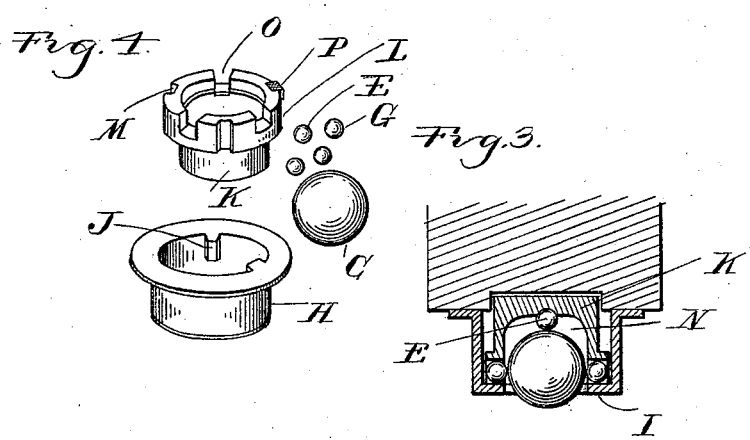
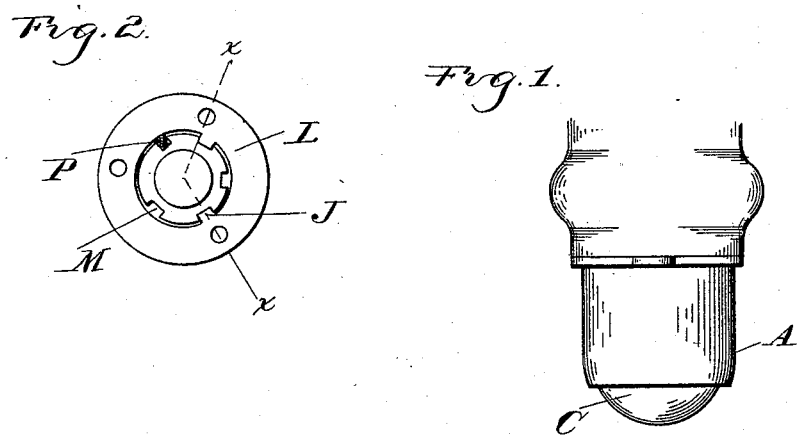
Inventor
Clarence A. Fellows
By [signature]
Att'ys.
Witnesses
A. L. Hobbie
N. L. Lindop

UNITED STATES PATENT OFFICE.

CLARENCE A. FELLOWS, OF THREE RIVERS, MICHIGAN.

FURNITURE-CASTER.

SPECIFICATION forming part of Letters Patent No. 492,624, dated February 28, 1893.

Application filed August 4, 1892. Serial No. 442,093. (No model.)

*To all whom it may concern:*

Be it known that I, CLARENCE A. FELLOWS, a citizen of the United States, residing at Three Rivers, in the county of St. Joseph and State of Michigan, have invented certain new and useful Improvements in Casters for Furniture, of which the following is a specification, reference being had therein to the accompanying drawings.

This invention relates to new and useful improvements in casters, and the invention belongs to that class of casters in which a ball is employed in place of the usual roller.

The invention consists in the peculiar construction of the socket in which the ball is journaled and the peculiar arrangement of the ball bearings for the upward and lateral thrust of the ball in use, all as more fully hereinafter described.

In the drawings, Figure 1 is a side elevation of my improved caster. Fig. 2 is a top plan view of the caster removed. Fig. 3 is a vertical section thereof on line *x x*. Fig. 4 is a detached perspective view of the parts of which the caster is composed. Fig. 5 is a vertical section through a modified form of caster. Fig. 6 is a horizontal section on line *z z* in Fig. 5.

A is the tubular casing adapted to be secured to the furniture in any suitable manner and having an integral flange B at its lower edge of thin metal adapted to be turned in when the ball C is in position, extending beneath the horizontal diameter of the ball and serving to prevent it from falling out, as plainly shown in Fig. 5.

The casing is provided centrally with an interior socket D adapted to receive the ball E and provided at three points on its side with sockets F to receive balls G which are located directly opposite the horizontal diameter of the caster ball. The parts being thus assembled and the flange B being turned in to hold the ball C from falling out, it is evident that the weight of the furniture will be carried on the ball through the medium of the ball bearing E and that any lateral thrust of the ball C will be taken up by the three side balls G, thus allowing the ball C to turn with the least possible friction and without touching the casing at any point.

This construction shows the principle of my invention to the best advantage, which I preferably employ in carrying it out as shown in Figs. 1, 2, 3, and 4, and which consists of an outer casing H, having an inward extending flange I at its lower end leaving a central aperture through which the lower edge of the ball C may protrude. This casing is considerably larger than the ball C and is provided on its inner edge at suitable points with the inwardly extending lugs J.

K is a detachable ball bearing case having at its lower end the enlarged ring L. This ring is provided with notches M corresponding to the lugs J on the casing H, and is also provided with three or more recesses O in its lower edge, arranged preferably at equal distances apart and of a suitable size to receive the ball bearing F. It is also provided at the top on its inner face with a suitable bearing for the central ball E.

To assemble the parts, the ball E is placed in its socket and the ball C in the central socket N in the casing K resting upon the ball E. The operator then engages the inner casing with the outer casing, the slots M engaging the lugs J, being forced down past those slots and then giving a partial rotation so that the upper edge of the flange or ring L rests beneath the lugs J and locks the two parts together, the balls G having in the meantime been inserted through the lower opening in the outer casing and placed in their respective sockets O, when the parts are tightly secured in position as described, there will be as shown in Fig. 3, the three balls F bearing upon the side of the ball C while the ball E will sustain the load in the manner previously described.

I preferably employ a rubber packing strip P to prevent possible rattling of the inner casing within the outer casing, this strip being placed in a suitable gain or notch in the side of the ring L, as shown in Fig. 4.

What I claim as my invention is—

1. In a caster, the combination of the outer casing having an inward extending flange at its lower edge, of a ball of greater diameter than the opening within said flange, the inner casing, a socket at the top of the inner casing, sockets at the lower edge of the casing, bearing balls in said sockets and lugs on the outer casing engaging projections on the inner casing for detachably securing the inner casing within the outer casing, substantially as described.

2. In a caster, the combination with the outer casing H having an inward extending flange I and the lugs J, of the ball C, the inner casing K having at its lower edge the ring L and the notches formed in said ring corresponding to the lug J, and sockets for the balls E and C, substantially as described.

In testimony whereof I affix my signature in presence of two witnesses.

CLARENCE A. FELLOWS.

Witnesses:
JAMES WHITTEMORE,
N. L. LINDOPS.